(12) United States Patent
Ellenburg et al.

(10) Patent No.: US 9,028,112 B2
(45) Date of Patent: May 12, 2015

(54) PERSONAL LIGHTING DEVICE

(71) Applicant: Nite Ize, Inc., Boulder, CO (US)

(72) Inventors: Parker Stephen Ellenburg, Boulder, CO (US); Howard Steve Ellenburg, Boulder, CO (US); Barbara Kay Ellenburg, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 67 days.

(21) Appl. No.: 13/843,641

(22) Filed: Mar. 15, 2013

(65) Prior Publication Data

US 2013/0215607 A1 Aug. 22, 2013

Related U.S. Application Data (63) Continuation-in-part of application No. 13/342,602, filed on Jan. 3, 2012, now Pat. No. 8,876,340.

(60) Provisional application No. 61/429,406, filed on Jan. 3, 2011.

(51) Int. Cl.
| | |
|---|---|
| *F21V 3/00* | (2006.01) |
| *F21V 5/00* | (2006.01) |
| *F21V 21/08* | (2006.01) |
| *B62J 6/00* | (2006.01) |
| *B62J 11/00* | (2006.01) |

(52) U.S. Cl.
CPC . *F21V 21/08* (2013.01); *B62J 6/00* (2013.01); *B62J 11/00* (2013.01)

(58) Field of Classification Search
CPC ............. F21V 21/08; B62J 11/00; B62J 6/00; F21S 9/02

USPC ......... 362/190, 191, 473, 103, 649, 650, 189, 362/486, 311.02, 362, 458, 433
See application file for complete search history.

(56) References Cited

U.S. PATENT DOCUMENTS

| | | | |
|---|---|---|---|
| 4,547,837 A * | 10/1985 | Bennett | ........................ 362/186 |
| 5,283,547 A | 2/1994 | Leon | |
| 5,465,197 A | 11/1995 | Chien | |
| 5,934,784 A | 8/1999 | Dion | |
| 6,386,730 B1 | 5/2002 | Matthews | |
| 6,474,830 B1 | 11/2002 | Hansen | |
| 6,539,920 B1 | 4/2003 | Spiers | |
| 6,857,770 B2 | 2/2005 | Moore | |

(Continued)

OTHER PUBLICATIONS

In the U.S. Appl. No. 12/098,738 Non-Final Office Action dated Aug. 12, 2009, 7 pages.

(Continued)

*Primary Examiner* — Anh Mai
*Assistant Examiner* — Glenn Zimmerman
(74) *Attorney, Agent, or Firm* — Squire Patton Boggs (US) LLP (57) ABSTRACT

A lighting device includes a first and second housing; the first housing has an inner threading and a first protrusion. The lighting device includes a second housing having an outer threading and a second protrusion. A user advances one protrusion over the other in order to activate the lighting device. The lighting device also includes an arm that is part of the first housing and a post that is part of the second housing. The arm and post prevent the first housing from rotating to a point where the threading of the housings release. The arm may be flexed inwards to prevent allow for the release of the first housing.

8 Claims, 11 Drawing Sheets

(56) References Cited

U.S. PATENT DOCUMENTS

| | | |
|---|---|---|
| 7,549,786 B2 | 6/2009 | Higley et al. |
| 7,695,154 B2 | 4/2010 | Ellenburg et al. |
| 2005/0207148 A1* | 9/2005 | Maglica ................. 362/197 |
| 2006/0007668 A1 | 1/2006 | Chien |
| 2007/0165415 A1* | 7/2007 | Henrici et al. ............ 362/457 |
| 2008/0055888 A1* | 3/2008 | Sharrah et al. ........... 362/106 |
| 2008/0253108 A1* | 10/2008 | Ellenburg et al. ......... 362/103 |
| 2009/0091921 A1 | 4/2009 | Yang |
| 2009/0226802 A1* | 9/2009 | Frick ........................ 429/149 |
| 2011/0096556 A1 | 4/2011 | Alexander et al. |
| 2012/0120639 A1 | 5/2012 | Armer et al. |

OTHER PUBLICATIONS

International Search Report in copending PCT Application No. PCT/US2012/020090, 3 pages.

U.S. Appl. No. 13/342,602 Non-Final Office Action dated Feb. 28, 2014, 11 pages.

* cited by examiner

PERSONAL LIGHTING DEVICE

CROSS REFERENCE TO RELATED APPLICATIONS

This application is related to U.S. Pat. No. 7,695,154 and incorporates the entirety of it by reference. This application is a continuation-in-part of U.S. patent application Ser. No. 13/342,602, which claims the benefit of U.S. Provisional Patent Application No. 61/429,406 filed on Jan. 3, 2011, the entirety of both applications are incorporated by reference.

BACKGROUND

Personal lighting devices are important to users for purposes of safety, decoration, and style. The ability to attach lighting devices to a number of different pieces of clothing, including, but not limited to, zippers and footwear, is desirable for users. The ability to attach such lighting devices in a way such that they are secure yet removable without cutting or major modifications to the clothing is also desirable. The ability to quickly and easily activate the lighting device is also desirable. For a number of years, articles of footwear and various items of clothing have been sold with decorative attachments. These attachments have either been lighted and non-removable or removable and non-lighted, neither of which have had the ability to be both lighted and removable or to be further customized by the wearer and activated or deactivated at will.

In addition to personal lighting devices that are attached to clothing, users desire to attach lighting devices to vehicles and accessories such as bicycles.

SUMMARY

In one embodiment, a personal lighting device includes a first housing including a light projection portion and an attachment portion, the attachment portion including an inner threading and a first protrusion. The personal lighting device further includes a second housing including a lighting mechanism cavity, an outer threading, a second protrusion, and a third protrusion; the second and third protrusions located proximate to each other having a first space and a second space between the second and third protrusion, the first space being less than the second space, the second housing interconnected with the first housing via the inner threading and the outer threading, the first protrusion having a first and second position, the first position between the second and third protrusion in the first space, the second position in the second space, and the second protrusion extending a lesser distance from the second housing than the third protrusion. The personal lighting device further includes a battery, a printed circuit board (PCB), and a light emitting diode (LED) mounted on the PCB, the battery located between the PCB and the second housing, the PCB located between the battery and the first housing such that, when the first protrusion is in the first position, the LED is not activated; and when the first protrusion is in the second position, the LED is activated. In one alternative, the personal lighting device includes a spring contact, oriented between the battery and the second housing, and a face of the PCB oriented towards the battery has first and second contact points, the first contact point for the battery and the second contact point for the spring contact; and when the first protrusion is in the second position, the spring contact is aligned with the second contact point of the PCB. Alternatively, a second protrusion extends a sufficient distance from the second housing to provide pressure against the first protrusion when the first and second housing are rotated, such that accidental activation of the lighting device is prevented. Optionally, the third protrusion extends a sufficient distance from the second housing to provide pressure against the first protrusion when the first and second housing are rotated, such that the first housing and the second housing may not be unattached without overcoming the pressure. This pressure, that prevents the first and second housing from becoming detached, also can function to make a battery lock; thus, making it far too difficult for anyone but an adult to manage. In one alternative, the second housing includes an attachment mechanism for attaching to a spoke. Optionally, the attachment mechanism includes an upper and lower clip portion, the upper and lower clip portion forming a first spoke holding area.

In another alternative, the upper and lower clip portions provide a pressure fit configuration for the spoke. Alternatively, the first spoke holding area is configured and sized to hold a cylindrical spoke; and the upper and lower clip portions further form a second spoke holding area, the second spoke holding area configured and sized to hold an elliptical spoke and/or a round spoke of small diameter. In another alternative, the upper and lower clip portions further form a third spoke holding area, the third spoke holding area configured and sized to hold a flat spoke. Optionally, the third spoke holding area overlaps the first and second spoke holding area. In one alternative, the personal lighting device further includes a wire clip, the wire clip oriented to interlock with protrusions on a side of the lower clip portion distal from the first spoke holding area. Optionally, pressure exerted by the wire clip increases as a protrusion, of the protrusions that the wire clip interlocks with, is increasingly distant from the opening for the first spoke holding area. Alternatively, the wire clip prevents a spoke from disengaging the first spoke holding area by providing pressure and a physical barrier. In one alternative, the second contact point has an approximately half-moon shape. Optionally, the personal lighting device further includes a living hinge lock, the living hinge lock integrated into the second housing, the first housing having a stop, the living hinge lock having a catch that interlocks with the stop that prevents the first housing and the second housing from turning beyond a certain point, and the certain point configured to retain the engagement of the outer and inner threading. In another option, the living hinge has a flexible hinge point configured to enable the flex of the hinge away from the second housing releasing the catch from the stop.

In another embodiment, a personal lighting device includes a first housing including a light projection portion and an attachment portion, the attachment portion including an inner threading and a first protrusion. The personal lighting device further includes a second housing including a lighting mechanism cavity, an outer threading, a second protrusion, and a third protrusion; the second and third protrusions located proximate to each other having a first space and a second space between the second and third protrusions, the first space being less than the second space; the second housing interconnected with the first housing via the inner threading and the outer threading; the first protrusion having a first and second position, the first position between the second and third protrusions in the first space, the second position in the second space, wherein the second protrusion extends a lesser distance from the second housing than the third protrusion, and the second and third protrusions are integrated into the outer threading; and the first and second housings being rotated in relation to each other to change positions of the first, second, and third protrusions. The personal lighting device further includes a battery and a printed circuit board (PCB).

The personal lighting device further includes a light emitting diode (LED) mounted on the PCB, the battery located between the PCB and the second housing, the PCB located between the battery and the first housing such that, when the first protrusion is in the first position, the LED is not activated; and when the first protrusion is in the second position, the LED is activated. The personal lighting device further includes a spring contact, oriented between the battery and the second housing, wherein a face of the PCB, oriented towards the battery, has first and second contact points, the first contact point for the battery and the second contact point for the spring contact; wherein when the first protrusion is in the second position, the spring contact is aligned with the second contact point of the PCB. Optionally, the personal lighting device further includes a living hinge lock, the living hinge lock integrated into the second housing, the first housing having a stop, the living hinge lock having a catch that interlocks with the stop that prevents the first housing and the second housing from turning beyond a certain point, the certain point configured to retain the engagement of the outer and inner threading, wherein the living hinge has a flexible hinge point configured to enable the flex of the hinge away from the second housing releasing the catch from the stop. Optionally, threading of the second space narrows distal from the first space such that a narrow portion of the second space engages the first protrusion and prevents over-rotation. In another option, the personal lighting device includes a pivot lock, the pivot lock configured to engage a stop in the first housing such that the pivot lock prevents the release of the first housing from the second housing, the pivot lock mounted on a pivot, such that the pivot lock is configured to rotate away from the stop and release the first housing from the second housing. In another option, the personal lighting device includes a slot on the pivot lock and a ridge on the second housing, the ridge and slot combination preventing the rotation of the pivot lock to release the first housing from the second housing.

In one embodiment, a method of operating a lighting device includes providing a lighting device having a first housing, a second housing, a first protrusion, and a second protrusion. The method further includes turning a first housing in relation to a second housing with enough force for a first protrusion to pass over a second protrusion. The method further includes activating a light in response to the turning. Optionally, the lighting device includes the first housing including a light projection portion and an attachment portion, the attachment portion including an inner threading and the first protrusion; the second housing including a lighting mechanism cavity, an outer threading, the second protrusion, and a third protrusion; the second and third protrusions located proximate to each other having a first space and a second space between the second and third protrusions, the first space being less than the second space, the second housing interconnected with the first housing via the inner threading and the outer threading; the first protrusion having a first and second position, the first position between the second and third protrusions in the first space, the second position in the second space, wherein the second protrusion extends a lesser distance from the second housing than the third protrusion and the second and third protrusions are integrated into the outer threading; and the first and second housings being rotated in relation to each other to change positions of the first, second, and third protrusions; a battery; a printed circuit board (PCB); a light emitting diode (LED) that is the light mounted on the PCB, the battery located between the PCB and the second housing, the PCB located between the battery and the first housing such that, when the first protrusion is in the first position, the LED is not activated, and when the first protrusion is in the second position, the LED is activated; a spring contact, oriented between the battery and the second housing, wherein a face of the PCB, oriented towards the battery, has first and second contact points, the first contact point for the battery and the second contact point for the spring contact, wherein when the first protrusion is in the second position, the spring contact is aligned with the second contact point of the PCB. In one alternative, the method further includes turning the first housing in relation to the second housing with enough force for the first protrusion to pass over the second protrusion, such that the first protrusion is in the first position and deactivating the light in response to the turning. Optionally, the method further includes turning the first housing in relation to the second housing with enough force for the first protrusion to pass over the third protrusion, therefore allowing the first and second housings to be separated. In another alternative, the lighting device includes a living hinge lock, the living hinge lock integrated into the second housing, the first housing having a stop, the living hinge lock having a catch that interlocks with the stop that prevents the first housing and the second housing from turning beyond a certain point, the certain point configured to retain the engagement of the outer and inner threading, wherein the living hinge has a flexible hinge point configured to enable the flex of the hinge away from the second housing releasing the catch from the stop; and the method further includes flexing the living hinge lock to disengage the catch from the stop.

In another embodiment, a personal lighting device includes a first housing including a light projection portion and an attachment portion, the attachment portion including an inner threading and a first protrusion, the first housing further having an arm. The device further includes a second housing including a lighting mechanism cavity, an outer threading, a second protrusion, the second protrusion having a first and second side, the second housing interconnected with the first housing via the inner threading and the outer threading; the first protrusion having a first and second position, the first position on the first side, the second position on the second side; the second housing further having a post, the post interacting with the arm such that the post and arm prevent the first housing from being unscrewed from the second housing unless the arm is flexed closer to a center of the first housing. The device further includes a battery and a printed circuit board (PCB). The device further includes a light emitting diode (LED) mounted on the PCB, the battery located between the PCB and the second housing, the PCB located between the battery and the first housing such that, when the first protrusion is on the first side, the LED is not activated; and when the first protrusion is on the second side, the LED is activated. Optionally, the device further includes a spring contact, oriented between the battery and the second housing, wherein a face of the PCB, oriented towards the battery, has first and second contact points, the first contact point for the battery and the second contact point for the spring contact, wherein when the first protrusion is on the second side, the spring contact is aligned with the second contact point of the PCB. In one alternative, the first housing includes a stop, and the stop interacts with the post to prevent the turning of the first housing past a certain rotation in relation to the second housing by stopping the stop with the post. In another alternative, one of the first and second housings includes a first and second aperture; and the device further includes a wire arm, the wire arm pivotally mounted in the first and second apertures, the wire arm configured to lock and release in a first and second boss on a first and second side of the one of the first and second housings. Optionally, the first and second apertures are offset, such that the wire arm is spring loaded, causing the wire arm to remain in an open position unless the wire arm is locked in the first and second boss.

In one embodiment, a method of operating a lighting device includes providing a lighting device having a first housing, a second housing, a first protrusion, and a second protrusion. The method further includes turning a first housing in relation to a second housing with enough force for a first protrusion to pass over a second protrusion. The method further includes activating a light in response to the turning. Optionally, the lighting device includes a light projection portion and an attachment portion in the first housing, the attachment portion including an inner threading and the first protrusion, the first housing further having an arm, a lighting mechanism cavity, and an outer threading in the second housing, the second protrusion having a first and second side, the second housing interconnected with the first housing via the inner threading and the outer threading, the first protrusion having a first and second position, the first position on the first side, the second position one the second side, the second housing further having a post, the post interacting with the arm such that the post and arm prevent the first housing from being unscrewed from the second housing unless the arm is flexed closer to a center of the first housing; a battery; a printed circuit board (PCB); and wherein the light is a light emitting diode (LED) mounted on the PCB, the battery located between the PCB and the second housing, the PCB located between the battery and the first housing such that, when the first protrusion is on the first side, the LED is not activated; and when the first protrusion is on the second side, the LED is activated. In one alternative, the method includes turning the first housing in relation to the second housing with enough force for the first protrusion to pass over the second protrusion, such that the first protrusion is in the first position and deactivating the light in response to the turning. Optionally, the method includes flexing the arm closer to the center of the second body and disengaging the first housing from the second housing.

BRIEF DESCRIPTION OF THE DRAWINGS

FIG. 1b shows a section of the lower portion of FIG. 1a;

FIG. 2d shows a bottom perspective view of the lower portion of

FIG. 2a;

FIG. 2e shows a top perspective view of the lower portion of FIG. 2a;

FIG. 3 shows a top perspective view of the lower portion of FIG. 1a;

FIG. 4b shows a cross-section of the personal lighting device of FIG. 4a;

FIG. 4c shows a perspective view of the personal lighting device of FIG. 4a;

FIG. 5b shows a cross-section of the personal lighting device of FIG. 5a;

FIG. 6b shows a perspective view of the wire clip of FIG. 6a;

DETAILED DESCRIPTION

In one embodiment, personal lighting devices include three primary components: a body, an attachment mechanism, and a lighting mechanism. These three components are integrated together and in many instances share pieces of the overall mechanism. In the embodiment described in the drawings, the personal lighting device generally has a bottom and top housing, although additional pieces may be used. The lighting device is generally made of molded plastic; however, a variety of materials may be used in construction.

Body

The body of a personal lighting device may take on many different shapes and sizes. Generally, small size is important to the user. In many of the embodiments depicted herein, the body of the personal lighting device has a round shape having a diameter of between one-half inch to one inch at the face of the personal lighting device. The shape shown of the face of the device is generally shown to be circular; however, in various alternatives, the shape may be square, rectangular, oval, octagonal, or any other shape desired. Graphics, images, engravings, or other patterns may appear on the face of the personal illumination device.

In one alternative, the body is translucent. In another alternative, it is transparent. In one alternative, the face of the body for the lighting device includes light channels to transmit the light to the edge of the face.

Attachment Mechanisms

As described above, various attachment mechanisms may be utilized for the personal lighting device. To some extent, the attachment mechanism included depends on the intended use of the personal lighting device. Although a number of novel attachment mechanisms are disclosed herein, alternatives will be apparent to those skilled in the art in light of this disclosure. Attachment mechanisms disclosed in U.S. Pat. No. 7,695,154 may be utilized in conjunction with the bodies and lighting mechanisms disclosed herein.

Figure 1A:
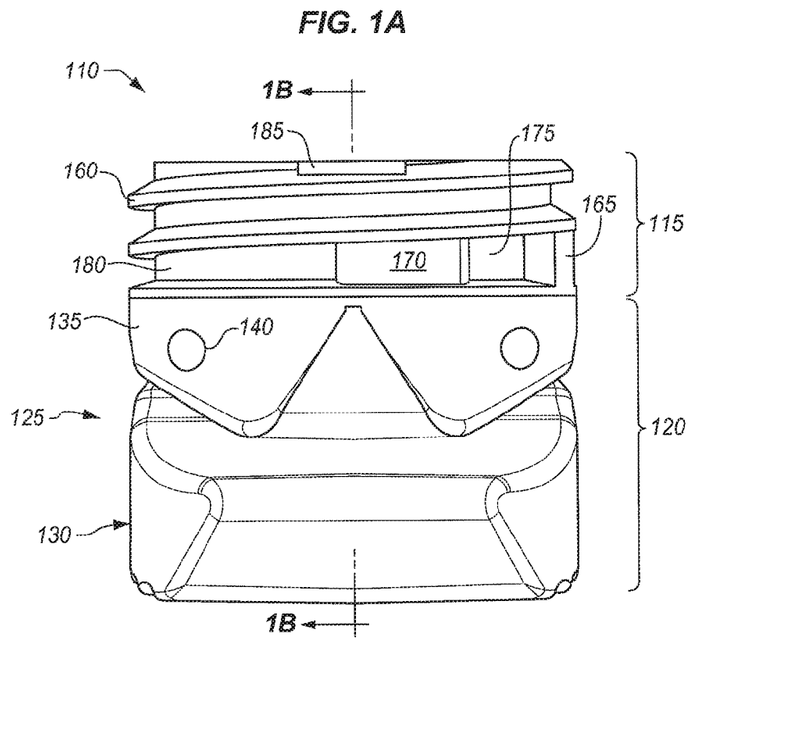
FIG. 1a shows a lower portion of one embodiment of a personal lighting device.
Figure 1B:
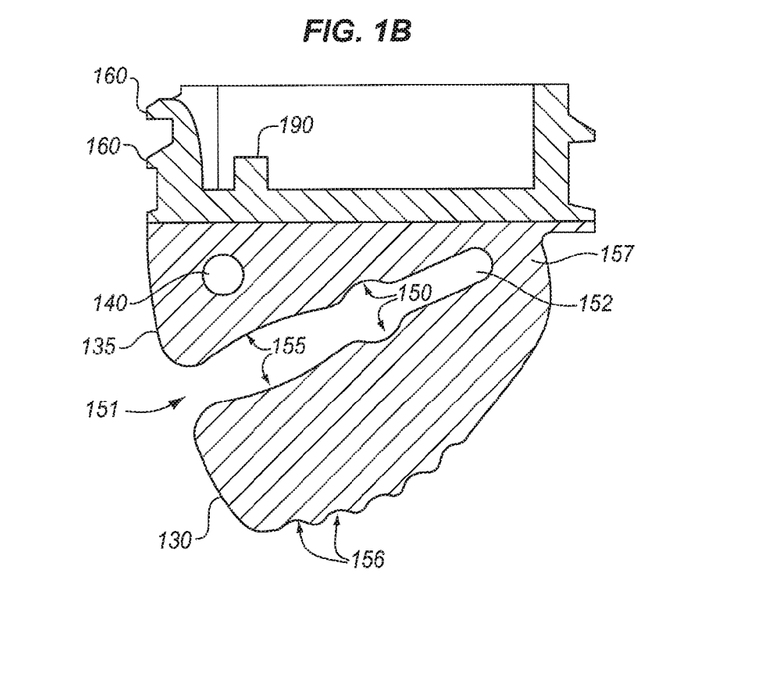

In one embodiment, an attachment mechanism is shown in FIGS. 1a and 1b. FIG. 1a shows the lower portion 110 of personal lighting device. Lower portion 110 includes lighting mechanism section 115 and attachment mechanism section 120. Attachment mechanism section 120 includes clip 125. Clip 125 includes lower clip portion 130 and upper clip portion 135. FIG. 1*b* shows a cross-section of the lower portion 110 of personal lighting device along cut B. Slot 151 is configured to receive the spoke of a bike. The shape of slot 151 includes an engagement area 150 specifically designed for a typical round bike spoke. Slot 151 is also large enough to accommodate various other spoke sizes. In operation, a user places the personal lighting device on a bike spoke by engaging the spoke with slot 151. Slot 150 is designed to engage the common cylindrical spoke. To fit alternative spokes, elliptical slot 155 is provided to fit an elliptical spoke, and the entire slot from end 152 to the opening of slot 155 can be used to fit a flat spoke. Lower clip portion 130 flexes away from upper clip portion 135 in order to allow the spoke to advance to engagement area 150. The size of slot 151 all the way to 152 is designed to be pressure fit. The material of lower portion 110 is sufficiently flexible for the force of a user pushing the personal lighting device on the spoke to flex the lower clip portion 130 at pivot 157.

The lower portion 110 of personal lighting device also includes circular hole 140 for a wire clamp or wire clip. The lower portion further includes locking ridges 156 for locking a wire clamp after the spoke has been engaged in engagement area 150. The engagement of a wire clamp prevents the flex of lower clip portion 130 at pivot 157 and the release of the spoke. The further the locking ridge or protrusions are from the mouth of the clip, the greater will be the pressure exerted. This provides additional locking to the pressure fit provided by the clip portion, and prevents the plastic that the clip is typically made of from deforming under pressure in that the clip is made of spring steel which will not yield or creep under continual force or pressure as the plastic would do if not supported by the steel. The spring steel clip maintains clamping force on the spoke over time.

Figure 2A:
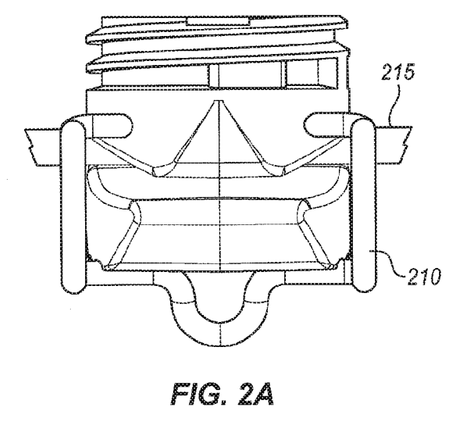
FIG. 2a shows a front view of the lower portion of one embodiment of a personal lighting device including a spoke.
Figure 2B:
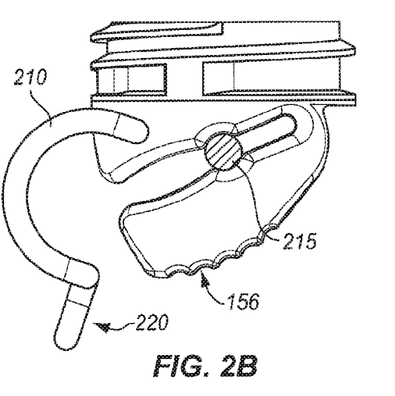
FIG. 2b shows a side view of the lower portion of FIG. 2a with a wire clip not engaged.
Figure 2C:
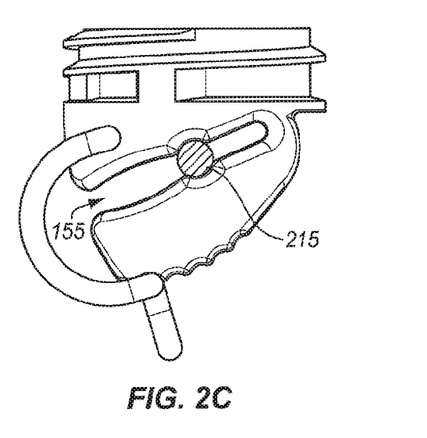
FIG. 2c shows a side view of the lower portion of FIG. 2a with the wire clip engaged.
Figure 2D:
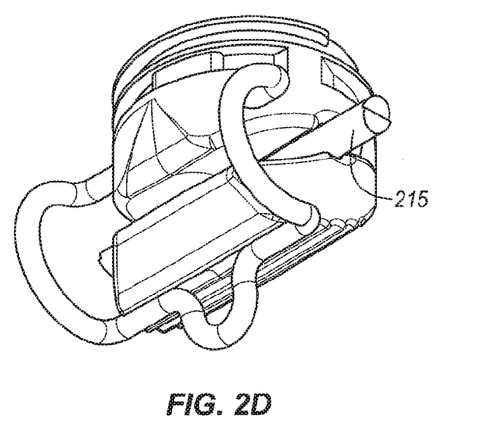
Figure 2E:
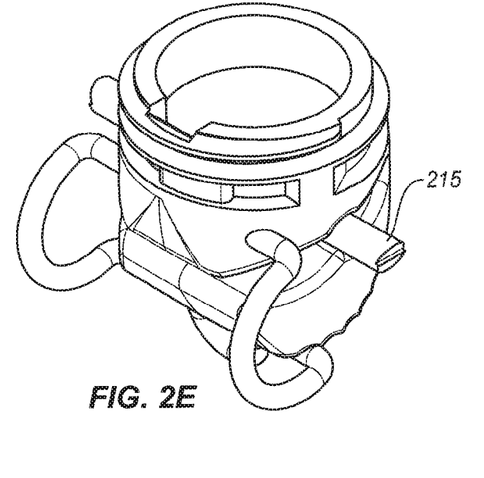
Figure 2F:
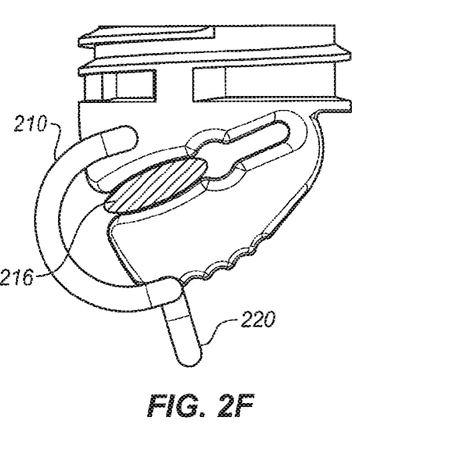
FIG. 2f shows a side view of the lower portion of FIG. 2a engaged with an oval-shaped spoke.
Figure 2G:
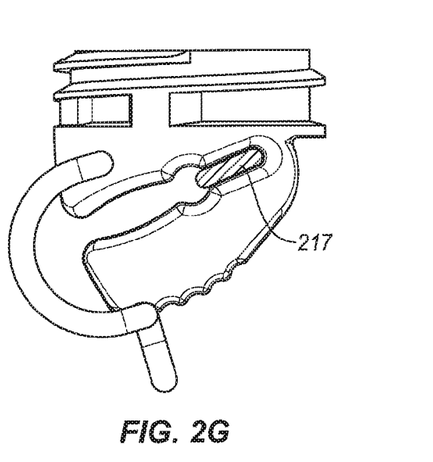
FIG. 2g shows a side view of the lower portion of FIG. 2a engaged with a flat spoke.
Figure 3:
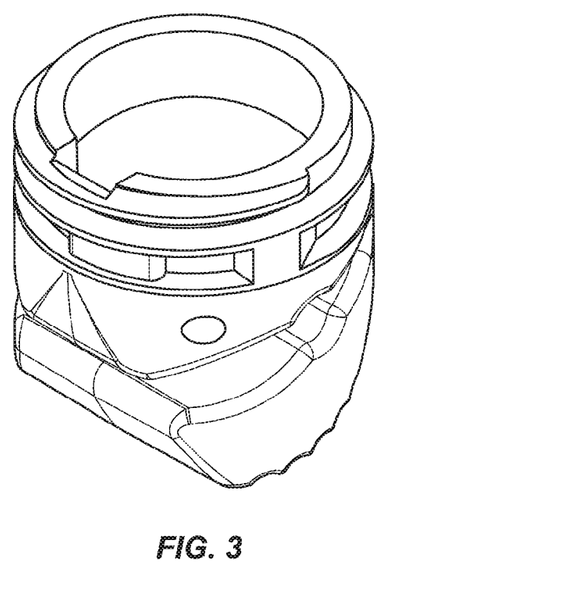

In FIGS. 2*a*-2*g*, various perspectives of the lower portion 110 of personal lighting device are shown. Wire clamp 210 is shown engaged and disengaged with locking ridges 156. In FIG. 2*b*, wire clamp 210 is disengaged from locking ridges 156. In this arrangement, the lower portion 110 of personal lighting device may be engaged or disengaged with a spoke 215. FIG. 2*c* shows wire clamp 210 engaged with locking ridges 156. Locking ridges 156 close to the mouth of slot 155 provide for less clamp force than locking ridges 156 distal from the mouth of slot 155. As shown, wire clamp 210 also includes a clamp handle 220 enabling the user to more easily engage and release wire clamp 210. FIG. 2*f* shows a side view of the lower portion of FIG. 2*a* engaged with an oval-shaped spoke 216. FIG. 2*g* shows a side view of the lower portion of FIG. 2*a* engaged with a flat spoke 217.

Alternatively, wire clamp 210 may be replaced with a cord allowing the device to be placed on a zipper by passing the cord through the zipper hole and then passing the device through the loop. In this case, the lower portion 110 may be modified to provide a grip or knob for the use to activate the device. Alternatively, a button hook may be provided for attachment as a button. In another alternative, a carabineer may be provided as an attachment mechanism. Alternatively, the attachment mechanism may include an adhesive area.

Lighting Mechanism

Figure 4A:
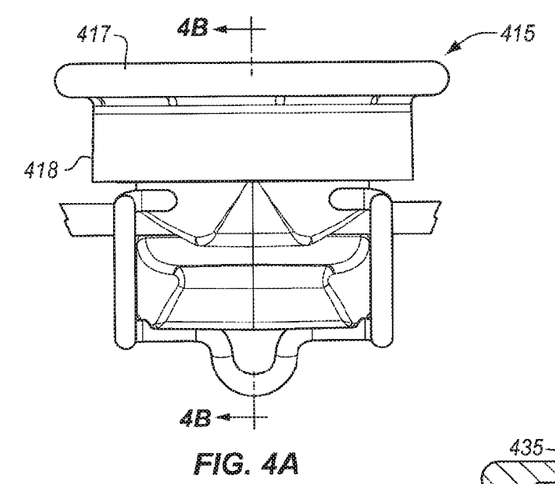
FIG. 4a shows a front view of one embodiment of a personal lighting device including a spoke.
Figure 4B:
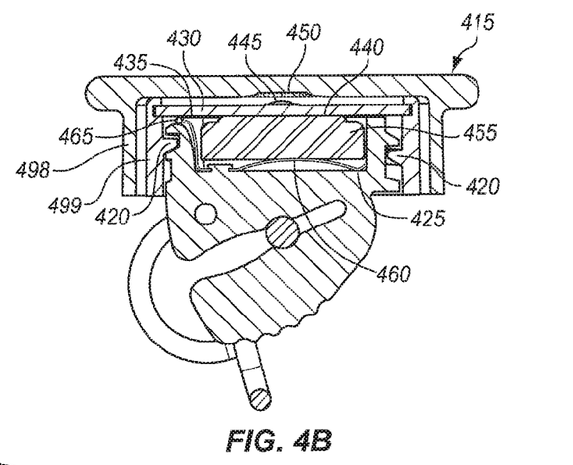
Figure 4C:
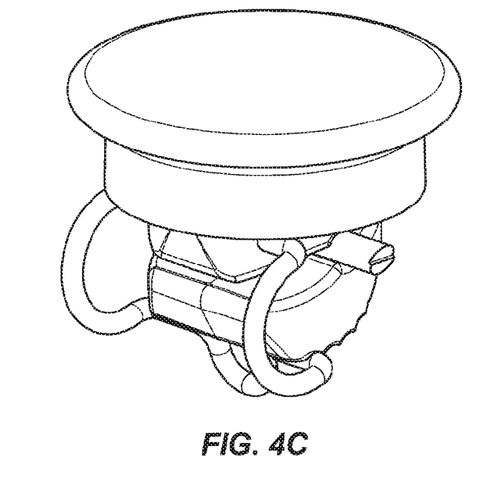
Figure 5A:
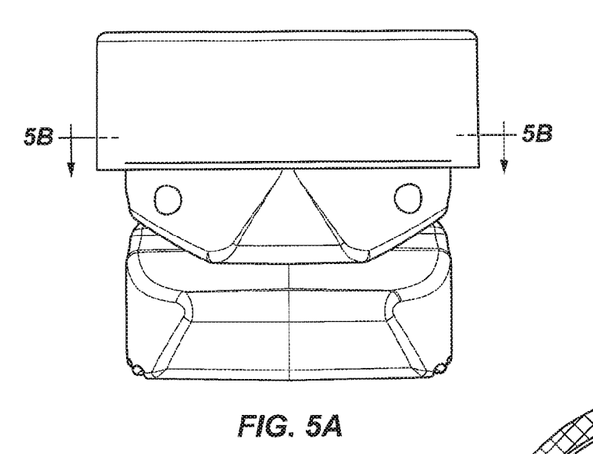
FIG. 5a shows a front view of one embodiment of a personal lighting device.
Figure 5B:
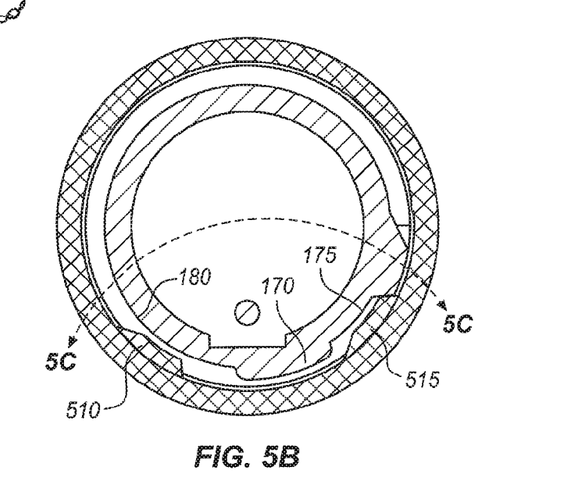
Figure 5C:
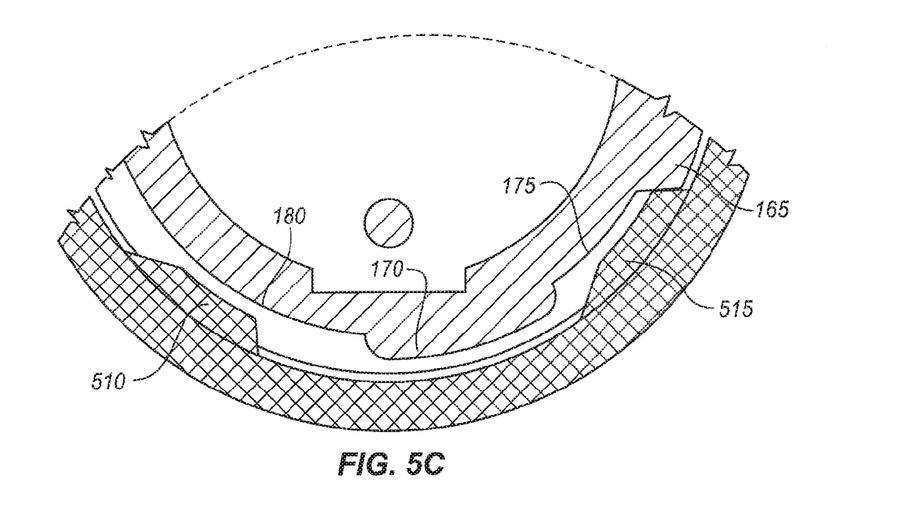
FIG. 5c shows a close-up view of the cross-section of FIG. 5b.
Figure 6A:
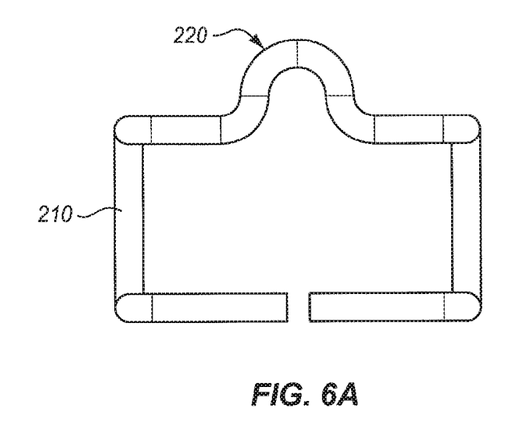
FIG. 6a shows a wire clip of one embodiment of a personal lighting device.
Figure 6B:
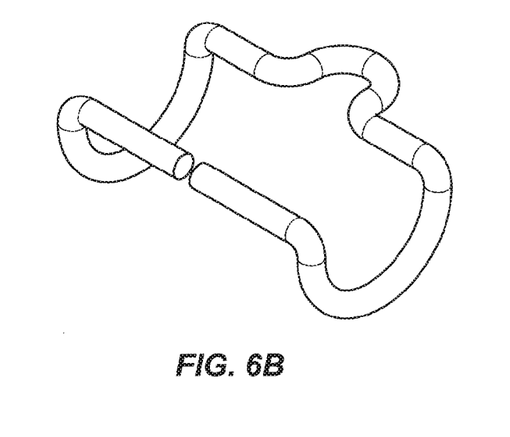

In one embodiment, the lighting mechanism includes a lower portion 110 including the mechanism section 115. The lighting mechanism further includes an upper portion 415. The lower portion 110 and the upper portion 415 (which is two pieces) may also be referred to as housings or bodies. The upper portion 415 includes light projection face 417 and grommet (base or ring) 418 which fits over mechanism section 115. FIG. 4*b* shows cross-section 4B. The upper portion 415 (which is two pieces) fits over the mechanism section 115 in a screw fit fashion. Referring back to FIG. 1*a*, thread 160 of mechanism section 115 is visible. The mechanism section 115 also includes a first and second channel 175, 180 and a first and second detent (sometimes referred to as protrusions) 165, 170. These channels and detents function to activate the lighting mechanism when rotational force is applied, as well as prevent upper portion 415 from disengaging from lower portion 110. More detail is provided below.

Figures 7, 8:
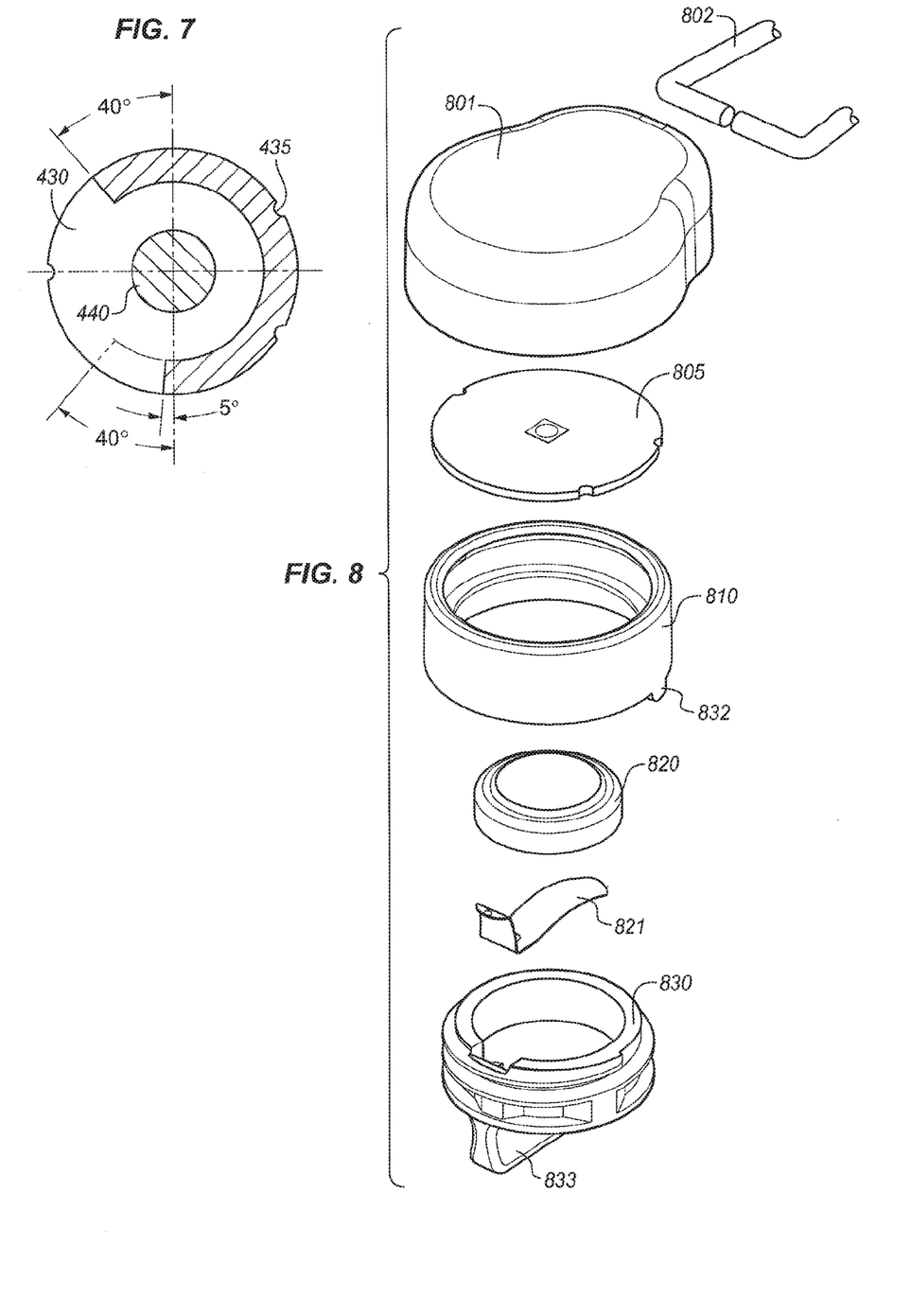
FIG. 7 shows an embodiment of a printed circuit board (PCB or mounting sheet)
FIG. 8 shows an exploded view of another embodiment of a personal lighting device.

Referring to FIG. 4*b*, upper portion 415 includes inner thread 420 for engaging thread 160 of the mechanism section 115. Additional parts of the mechanism include spring contact 425 and mounting sheet 430, which includes outer foil contact 435 and inner foil contact 440. LED 445 is mounted on mounting sheet 430 under lens section 450 of light projection face 417. Mounting sheet 430 may be a printed circuit board (PCB) or other sheet; in any case, mounting sheet 430 includes the circuitry needed to run light emitting diode (LED) 445. Upper portion 415 is composed of two sub parts, the decorative outer portion 498 and the inner portion 499. Inner portion 499 includes the functional pieces of the lighting device and outer portion 498 is decorative and may be exchanged for other decorative outer pieces. When assembled the space occupied by battery 455 is such that battery 455 is pushed against spring contact 425. This compresses the bent portion 460 of spring contact 425 towards a flat position, which extends contact end 465 of spring contact 425 to the PCB, thus potentially completing a circuit and activating LED 445. As shown in FIG. 7, the mounting sheet 430 includes two areas for electrical contact, contact area 440 for the middle of battery 455 to contact mounting sheet 430 and outer contact area 435 for contacting spring contact 425. When the spring contact is in contact with the outer contact area, the circuit is activated. Mechanism section 115 has a cutout 185 for holding spring contact 425 and an attachment protrusion 190 for attachment of spring contact 425 via heat staking to protrusion 190 or other means. Spring contact 425 may include a small hole that engages protrusion 190 to hold spring contact 425 in place via a heat staking, secondary process.

Referring to FIGS. 1*a*, 3, and 5*a*-5*c*, the positioning and arrangement of upper portion 415 and mechanism section 115 are shown for off and on operation. Section 5B shows the position of the detent on upper portion 415 for on and off operation. Note that there is only one detent; however, two positions for detent 510, 515 are shown. In the position shown by detent 510, the mechanism is on. This means that the outer contact area 435, which is in the form of a half-moon shape, is contacted by spring contact 465. In the position shown by detent 515, the mechanism is off. This means that the top has been turned so that the spring contact does not touch the half-moon shaped contact area 435 because it has been rotated out of the half-moon shaped portion. Second detent 170 prevents the accidental activation of the lighting mechanism. Second detent 170 protrudes less from mechanism section 115 than first detent 165. First detent 165 is to prevent upper portion 415 from turning, such that upper portion 415 is released from the mechanism section. Therefore, when detent 515 is in first channel 175, the mechanism is off and the user has to exert enough rotation force on upper portion 415 for detent 515 to overcome the pressure provided by second detent 170. When detent 510 is in second channel 180, the mechanism is on. Second channel 180 narrows distal to first channel 175 such that the narrowing of second channel 180 prevents the over rotation of upper portion 415. This offers an advantage over other mechanisms since this narrowing prevents damage to the PCB or upper and lower portion.

Figure 9A:
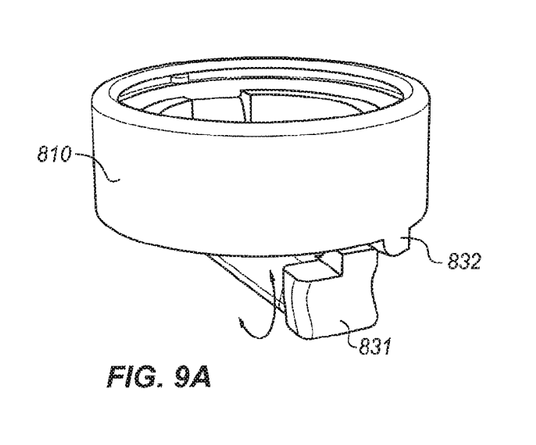
FIGS. 9a and 9b show an integrated view of the embodiment of FIG. 8.

FIG. 8 shows another embodiment of a personal lighting device. This embodiment includes top 801 that includes zipper attachment rope 802. Top 801 may include a graphic or other design. The printed circuit board (PCB) 805 may be similar or identical to the one described above. The top housing 810 is configured to receive in an interchangeable fashion the top 801. Battery 820 and spring 821 may be configured similarly to the battery and spring as described above. Bottom housing 830 includes the same detent system as described above. The bottom housing 830 also includes a handle 833 and living hinge lock 831 (not visible in this figure, refer to FIG. 9) for turning the device.

Figure 9B:
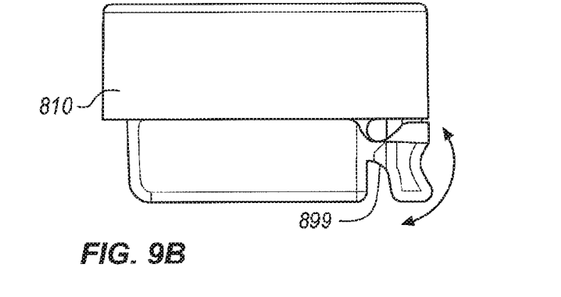

The living hinge lock 831 can more clearly be seen in FIG. 9a (which shows the opposite side as FIGS. 8) and 9b. This living hinge lock 831 interfaces with stopper 832. FIG. 9a shows the living hinge lock 831 in an open position. To lock it, the living hinge lock 831 is flexed down, such that the stopper 832 may fit in the slot of the living hinge lock 831. In this configuration, the living hinge lock 831 prevents bottom housing 830 from turning beyond a certain point, thereby preventing the release of the top housing from the bottom housing. The living hinge has a flex point 899 of resilient but thin plastic to provide for the flexing. In effect, this locks the device. This lock may be incorporated into any of the embodiments.

Figure 10:
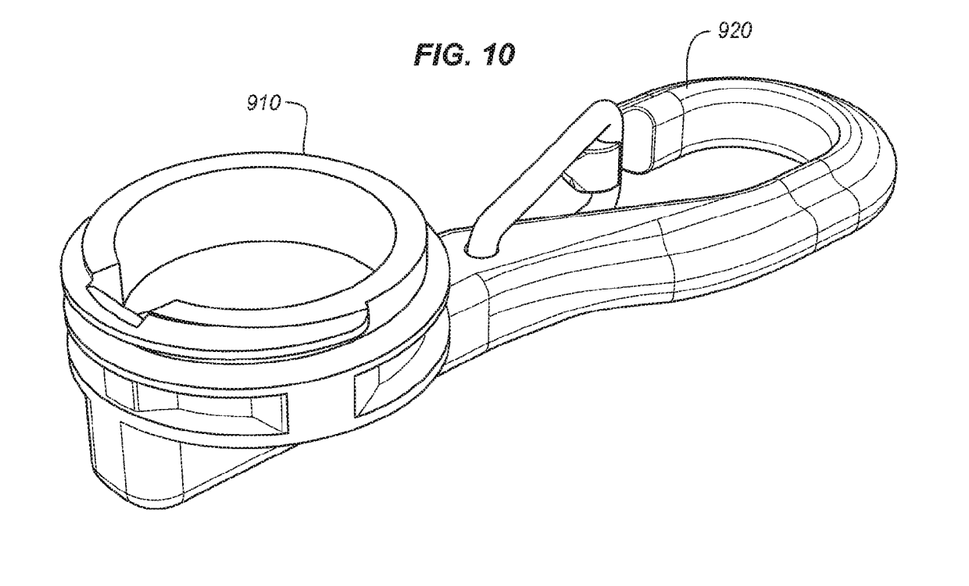
FIG. 10 shows another embodiment of a personal lighting device.

FIG. 10 shows another embodiment of a personal lighting device only showing the base portion 910 that includes the attachment mechanism, in this case, a carabineer 920. It works in a similar fashion as described above.

Figure 11:
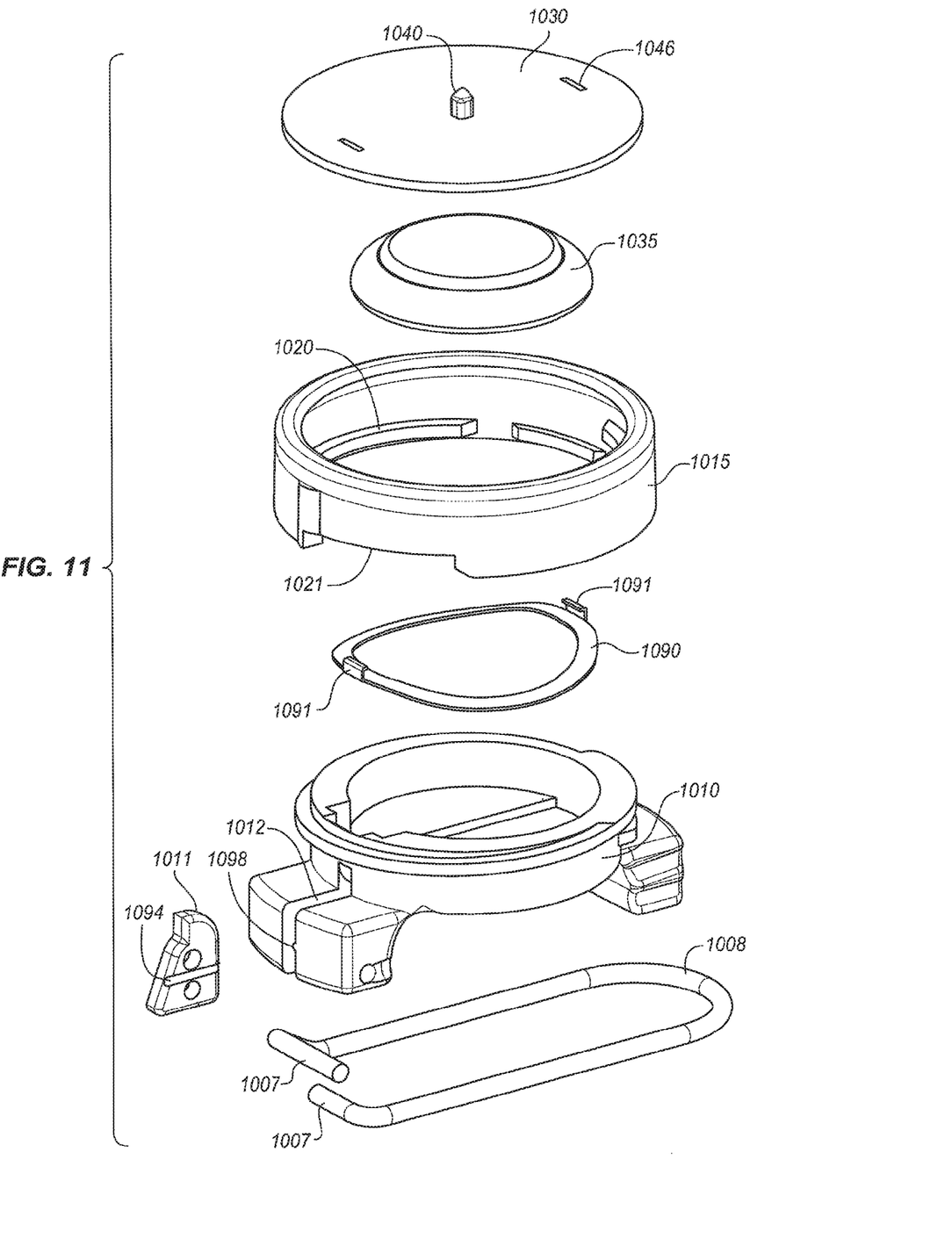
FIG. 11 shows an exploded view of a module with a locking mechanism.

FIG. 11 shows another embodiment of a personal lighting device that includes a locking mechanism. This mechanism may be incorporated into any of the other embodiments. Any element from one embodiment may be incorporated into any other embodiment. This embodiment is similar to previous embodiments. The spring connector is not used in this embodiment. Included are PCB 1030 and LED 1040. PCB 1030 includes slots 1046 for the interconnection of battery holding washer 1090, which includes slot attachment lips 1091. Battery 1035 may have side connection points and washer 1090 contacts these connection points providing for interconnection. Top housing 1015 includes threaded interior 1020 and interconnects with base 1010. When top housing 1015 is screwed towards base 1010 the space occupied by battery 1035 and battery holding washer 1090 is reduced, such that the positive portion of battery 1035 touches PCB 1030 completing the circuit. Pivot lock 1011 fits into slot 1012 and is held in a pivoting arrangement by the ends 1007 of wire interconnect 1008. The pivot lock fits into the recess 1021 and may pivot in and out of these slots when activated by the user, thereby enabling the user to unlock the housing. A slot 1094 that bisects the two holes and interacts with the ridge 1098 is also shown. When assembled, the slot 1094 and the ridge 1098 interact to prevent accidental rotation out of the lock position.

Figure 12:
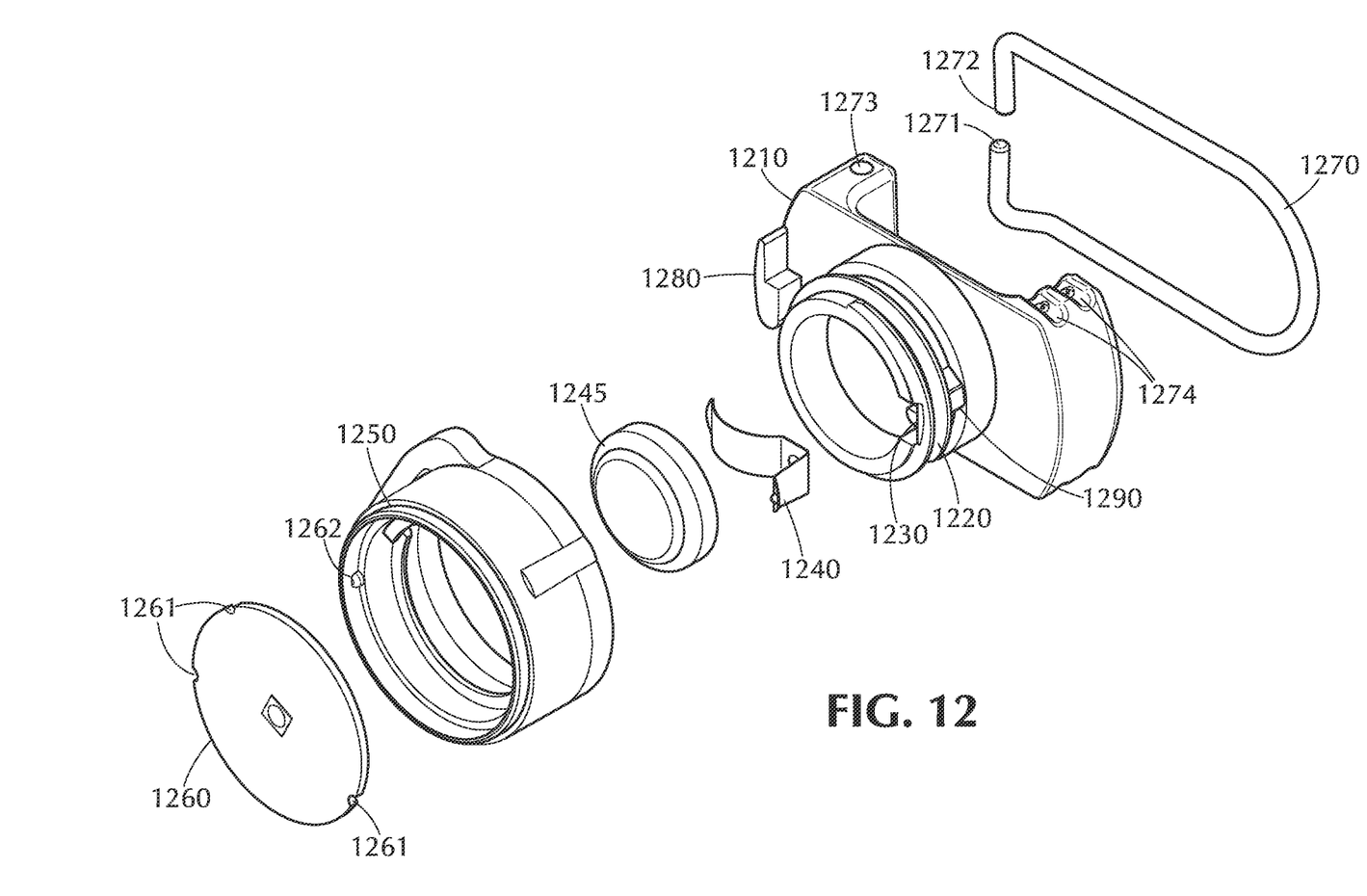
FIG. 12 shows an alternative embodiment of a personal lighting device.

FIG. 12 shows an alternative embodiment of a personal lighting device. This configuration includes a lock that prevents the cap from accidentally coming unscrewed. The device of FIG. 12 is configured to be locked on the shoelace of a shoe or other relatively thin flat strap-like mount. The device includes a lower body piece 1210 and a notch 1230 for receiving spring contact 1240 and includes a threaded connection area for the upper body piece 1250. The spring contact 1240 fits into the lower body piece 1210, and battery 1240 sits on top of the spring contact 1240. The device includes an upper housing 1250 which includes protrusions 1262 for receiving dents 1261 of the printed circuit board 1260. The arrangement and operation of these items is similar to previous embodiments described above.

The device of FIG. 12 also includes a dent 1290 on lower body 1210 for on and off operation similar to as described above. A post 1280 which works in concert with arm 1330 (shown in FIG. 13) assists in preventing the accidental release of the upper housing 1250. The lower body also includes two receiving apertures 1273 (only one shown in FIG. 12). Receiving apertures 1273 receive the bent ends 1271, 1272 of wire arm 1270. The receiving apertures 1273 are offset such that they are not directly in a perpendicular line. When bent ends 1271, 1272 are inserted, this causes the wire arm 1270 to be spring loaded due to its having to be bent slightly to insert both bent ends 1271, 1272. This causes arm 1270 to sit in a closed or open position when not locked in bosses 1274 which are on either side of lower body 1210. When parallel to the bottom piece but not engaged with grooves 1274, the lock wire is held in a closed position. When in the open position, the lock wire is approximately perpendicular to the bottom of lower body 1210. This open position assists in the mounting of the device on a shoelace or other strap-like item, since the user does not need to hold the wire arm 1270 open during mounting. The user then may snap the wire arm into one of the two sets of bosses 1274, the two sets allowing for a thicker or thinner shoelace to be used, while retaining a tight fit of the lace between the wire arm 1270 and the bottom of the lower body 1210.

Figure 13:
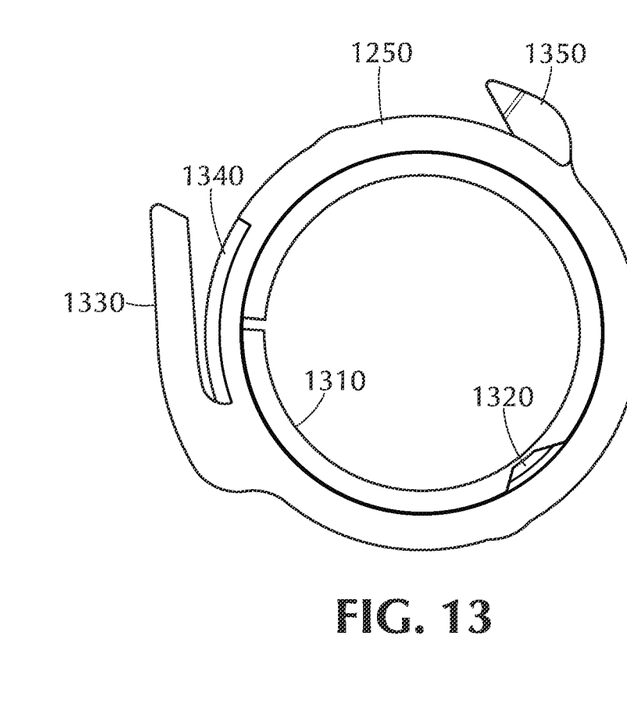
FIG. 13 shows the top piece of the personal lighting device of FIG. 12.

FIG. 13 shows the upper housing 1250. The upper housing includes an inner thread 1310 and a protrusion or dent 1320 that interacts with dent or protrusion 1290 of the lower body 1210, similar to as described above. This system only includes one dent on each of the threading of the lower body and upper housing, since the prevention of the over turning or removal of the cap is controlled by a different mechanism. Essentially the same PCB of FIG. 7 may be used and the off and on turning function operates similarly. Arm 1330, slot 1340, and stop 1350 prevent the release or over torsioning of upper housing 1250 on lower body 1210. This occurs through interactions with post 1280. Arm 1330 and slot 1340 interact with post 1280 as the upper housing 1250 is turned in relation to the lower body 1210. When the upper housing 1250 is locked on, the arm 1330 is a greater radial distance from the center of the device than post 1280, such that the end point of the arm where the arm 1330 joins the upper housing 1250 prevents the further rotation of the upper housing and the release of the upper housing 1250 by escaping the interaction of the inner threading 1310 and the threading 1220 of the lower body 1210. The arm 1330 may be flexed inside of post 1280 to allow for further rotation, allowing upper housing 1250 to be removed and battery 1245 to be replaced. Back post 1280 also interacts with the side of housing 1210 and may not be flexed past the side of the body, stopping the rotation. This prevents the over rotation of upper housing 1250, which might over compress the interior parts, potentially damaging them.

Figure 14:
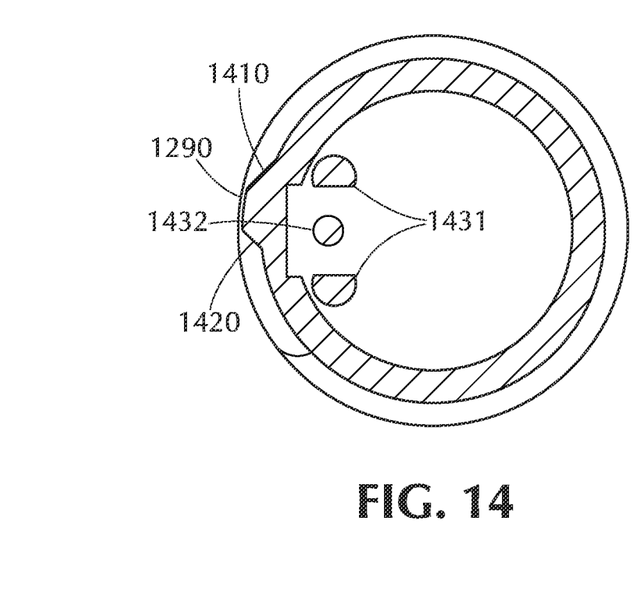
FIG. 14 shows a cross-section of the bottom piece of the personal lighting device of FIG. 12.

FIG. 14 shows a cross-section of the threaded portion of the lower body 1210. Here dent 1290 is more clearly visible and is shown to have two sides 1410, 1420. The steepness of these two sides may be adjusted and configured to be steeper or more gradual which will control how hard it is to turn off and on the light. A more steep grade on dent 1290 will provide for a greater instantaneous amount of force to turn off and on the light. Lower body 1210 also includes three small posts, 1431, 1432 for aligning and holding spring contact 1240.

As stated above, the alternative bodies, attachment mechanisms, and lighting mechanisms may be integrated into the described personal lighting system including those described in U.S. Pat. No. 7,695,154. The embodiments described herein are generally configured to attach to clothing or vehicles having spokes; however, alternative attachment mechanisms may be apparent to those skilled in the art in light of this disclosure.

The embodiments described above and shown herein are illustrative and not restrictive. The scope of the personal lighting devices is indicated by the claims rather than by the foregoing description and attached drawings. The personal lighting devices may be embodied in other specific forms without departing from the spirit of the personal lighting devices described. Accordingly, these and any other changes which come within the scope of the claims are intended to be embraced therein.

We claim:

1. A personal lighting device comprising:
(a) a first housing including a light projection portion and an attachment portion, the attachment portion including an inner threading and a first protrusion, the first housing further having an arm;
(b) a second housing including a lighting mechanism cavity, an outer threading, a second protrusion, the second protrusion having a first and second side, the second housing interconnected with the first housing via the inner threading and the outer threading; the first protrusion having a first and second position, the first position on the first side, the second position on the second side, the second housing further having a post, the post interacting with the arm such that the post and arm prevent the first housing from being unscrewed from the second housing unless the arm is flexed closer to a center of the first housing;
(c) a battery;
(d) a printed circuit board (PCB); and
(e) a light emitting diode (LED) mounted on the PCB, the battery located between the PCB and the second housing, the PCB located between the battery and the first housing such that, when the first protrusion is on the first side, the LED is not activated; and when the first protrusion is on the second side, the LED is activated.

2. The personal lighting device of claim 1, further comprising:
(f) a spring contact, oriented between the battery and the second housing, wherein a face of the PCB, oriented towards the battery, has first and second contact points, the first contact point for the battery and the second contact point for the spring contact, wherein when the first protrusion is on the second side, the spring contact is aligned with the second contact point of the PCB.

3. The personal lighting device of claim 1 wherein the first housing includes a stop, and the stop interacts with the post to prevent the turning of the first housing past a certain rotation in relation to the second housing by stopping the stop with the post.

4. The personal lighting device of claim 1 wherein one of the first and second housings includes a first and second aperture, and further comprising:
a wire arm, the wire arm pivotally mounted in the first and second apertures, the wire arm configured to lock and release in a first and second bosses on a first and second side of the one of the first and second housings.

5. The personal lighting device of claim 4 wherein the first and second apertures are offset, such that the wire arm is spring loaded, causing the wire arm to remain in an open position unless the wire arm is locked in the first and second bosses.

6. A method of operating a lighting device, the method comprising:
(a) providing a lighting device having a first housing, a second housing, a first protrusion, and a second protrusion;
(b) turning a first housing in relation to a second housing with enough force for a first protrusion to pass over a second protrusion; and
(c) activating a light in response to the turning; wherein the lighting includes a light projection portion and an attachment portion in the first housing, the attachment portion including an inner threading and the first protrusion, the first housing further having an arm, a lighting mechanism cavity, and an outer threading in the second housing, the second protrusion having a first side and a second side, the second housing interconnected with the first housing via the inner threading and the outer threading, the first protrusion having a first position and a second position, the first position on the first side, the second position on the second side, the second housing further having a post, the post interacting with the arm such that the post and arm prevent the first housing from being unscrewed from the second housing unless the arm is flexed closer to a center of the first housing; a battery; a printed circuit board (PCB); and wherein the light is a light emitting diode (LED) mounted on the PCB, the battery located between the PCB and the second housing, the PCB located between the battery and the first housing such that, when the first protrusion is on the first side, the LED is not activated; and when the first protrusion is on the second side, the LED is activated.

7. The method of claim 6, further comprising:
(d) turning the first housing in relation to the second housing with enough force for the first protrusion to pass over the second protrusion, such that the first protrusion is in the first position; and
(e) deactivating the light in response to the turning of (d).

8. The method of claim 7, further comprising:
(f) flexing the arm closer to the center of the second body; and
(g) disengaging the first housing from the second housing.

* * * * *